US012269972B2

United States Patent
Schümann et al.

(10) Patent No.: US 12,269,972 B2
(45) Date of Patent: Apr. 8, 2025

(54) REACTIVE ADHESIVE FILM WITH GOOD HEAT-AND-HUMIDITY RESISTANCE, IN PARTICULAR FOR BONDING POLYAMIDE

(71) Applicant: TESA SE, Norderstedt (DE)

(72) Inventors: Uwe Schümann, Pinneberg (DE);
Séverine Crouzy, La Boisse (FR);
Björn Zeysing, Hamburg (DE);
Claudia Moehrke, Hamburg (DE);
Marta Lunding, Norderstedt (DE)

(73) Assignee: Tesa SE, Norderstedt (DE)

( * ) Notice: Subject to any disclaimer, the term of this patent is extended or adjusted under 35 U.S.C. 154(b) by 330 days.

(21) Appl. No.: 17/760,633

(22) PCT Filed: Oct. 7, 2020

(86) PCT No.: PCT/EP2020/078027
§ 371 (c)(1),
(2) Date: Mar. 15, 2022

(87) PCT Pub. No.: WO2021/073959
PCT Pub. Date: Apr. 22, 2021

(65) Prior Publication Data
US 2022/0340795 A1    Oct. 27, 2022

(30) Foreign Application Priority Data
Oct. 14, 2019   (DE) ............... 10 2019 215 766.1

(51) Int. Cl.
| | | |
|---|---|---|
| *C09J 163/10* | (2006.01) | |
| *C09J 7/38* | (2018.01) | |
| *C09J 11/04* | (2006.01) | |
| *C09J 11/06* | (2006.01) | |
| *C09J 133/08* | (2006.01) | |
| *C09J 133/10* | (2006.01) | |

(52) U.S. Cl.
CPC ............ *C09J 163/10* (2013.01); *C09J 7/385* (2018.01); *C09J 11/04* (2013.01); *C09J 11/06* (2013.01); *C09J 133/08* (2013.01); *C09J 133/10* (2013.01); *C09J 2301/302* (2020.08); *C09J 2301/408* (2020.08); *C09J 2400/166* (2013.01); *C09J 2400/225* (2013.01)

(58) Field of Classification Search
CPC . C09J 163/10; C09J 7/385; C09J 11/04; C09J 11/06; C09J 133/08; C09J 133/10; C09J 2301/302; C09J 2301/408; C09J 2400/166; C09J 2400/225; C09J 4/06; C09J 2400/163; C09J 5/00; C09J 151/08; C09J 2463/00; C09J 2469/006; C09J 2475/00; C09J 2477/006; C09J 7/10; C08F 283/006; C08K 5/0091; C08K 5/14; C08K 5/3415
See application file for complete search history.

(56) References Cited

U.S. PATENT DOCUMENTS

| | | | |
|---|---|---|---|
| 10,400,140 B2 | 9/2019 | Schümann et al. | |
| 2016/0108287 A1* | 4/2016 | Schümann | C09J 7/00 427/208.4 |
| 2016/0264823 A1 | 9/2016 | Schümann et al. | |
| 2018/0215955 A1 | 8/2018 | Claret et al. | |
| 2018/0237629 A1 | 8/2018 | Yachi et al. | |
| 2019/0077997 A1* | 3/2019 | Demarez | C09J 7/38 |
| 2019/0144724 A1* | 5/2019 | Dollase | C09J 179/00 156/330 |

FOREIGN PATENT DOCUMENTS

| | | |
|---|---|---|
| EP | 0300847 A1 | 1/1989 |
| EP | 3010989 A1 | 4/2016 |
| EP | 3063243 A1 | 9/2016 |
| EP | 3328951 A1 | 6/2018 |
| WO | 2014/202402 A1 | 12/2014 |
| WO | 2017/102282 A1 | 6/2017 |
| WO | 2017/174303 A1 | 10/2017 |
| WO | 2017/190949 A1 | 11/2017 |
| WO | 2018104053 A1 | 6/2018 |
| WO | 2020/069884 A1 | 4/2020 |

OTHER PUBLICATIONS

NAGASE America LLC, Vinyl Cyclohexene Oxide, May 26, 2014, https://nagaseamerica.com/product/vinyl-cyclohexene-oxide/. (Year: 2014).*
International Search Report dated Dec. 18, 2020, in connection with PCT International Application No. PCT/EP2020/078027.
English translation of International Search Report dated Dec. 18, 2020, in connection with PCT International Application No. PCT/EP2020/078027.
Written Opinion in connection with PCT International Application No. PCT/EP2020/078027.

* cited by examiner

*Primary Examiner* — Christopher W Raimund
(74) *Attorney, Agent, or Firm* — Norris McLaughlin, PA

(57) ABSTRACT

Reactive adhesive film for bonding various materials, including plastic to metal, the adhesive film comprising (a) a polymeric film-forming matrix, (b) at least one epoxide-functionalized (meth)acrylate or vinyl monomer and (c) a reagent selected from an initiator, in particular a free-radical initiator, or an activator. Further disclosed are reactive adhesive film systems comprising two reactive adhesive films. Methods for producing reactive adhesive films, and methods are also disclosed.

20 Claims, No Drawings

REACTIVE ADHESIVE FILM WITH GOOD HEAT-AND-HUMIDITY RESISTANCE, IN PARTICULAR FOR BONDING POLYAMIDE

This is an application filed under 35 USC 371 based on PCT/EP2020/078027, filed 7 Oct. 2020, which claimed priority to DE 102019215766.1, filed 14 Oct. 2019. The present application claims the full priority benefit of all prior applications and incorporates by reference their full disclosures as if set forth herein.

TECHNICAL FIELD OF THE INVENTION

The present invention relates to a reactive adhesive film based on epoxide-functionalized (meth)acrylic ester and/or vinyl monomers for bonding various materials, such as, for example, plastic, more particularly polyamide and polycarbonate, and metal, more particularly aluminum. The reactive adhesive film comprises (a) a polymeric film-forming matrix and (b) at least one epoxide-functionalized, reactive (meth) acrylic ester or vinyl monomer and a reagent selected from an initiator, more particularly a radical initiator, or an activator. The present invention relates more particularly to a reactive adhesive film system comprising two reactive adhesive films as described above, where the first reactive adhesive film comprises a radical initiator and the second reactive adhesive film comprises an activator. Further provided are a kit for providing the reactive adhesive film system of the invention, comprising a first and a second reactive adhesive film as described above, and also a method for producing the reactive adhesive film of the invention, as described above.

GENERAL PRIOR ART 2-component adhesive systems based on acrylic monomers have been general knowledge for years and are described in depth in the specialist literature. In these radically polymerizing systems, an adhesive system consisting of two components is applied to the parts to be bonded, typically using two liquid components. For example, one component consists of the monomers to be polymerized and an activator, and the other component consists of a radical-forming substance (also called curing agent or initiator) and the monomers to be polymerized. After the two components have been mixed or at least brought into contact, chemical reaction of the activator with the radical-forming substance produces at least one radical, and the polymerization reaction of the monomers to be polymerized begins. The radical chain polymerization of the monomer then takes place until a chain termination occurs, and the adhesive composition cures, so achieving permanent bonding of the parts to be bonded.

A disadvantage of such liquid 2-component polymerization adhesive systems is that they are often not clean in use, because the two components must in most cases be applied in the liquid to pasty state to the parts to be bonded. This is a problem both with very small and narrow bonds and with extensive bonds and/or with applications in which the surfaces are uneven—inclined, for example.

2-component adhesive systems based on acrylic monomers are likewise known in the form of pressure sensitive adhesive films (adhesive tapes). They are described for example in EP0300847A1, EP3010989A1, EP3063243A1, EP3328951A1, WO2017102282A1 and also in WO2018104053A1. A substantial disadvantage of these adhesive systems is that their heat-and-humidity resistance is not optimal. While WO2018104053A1 does provide an attempted solution to this problem, the results on difficult-to-bond substrates, such as polyamide in particular, are unsatisfactory.

OBJECT OF THE PRESENT INVENTION

The object underlying the present invention, accordingly, is to provide a reactive adhesive film which is improved in terms of heat-and-humidity resistance, which can be cured with a second reactive adhesive film or with a second component, and with which high bond strengths are achievable. In particular, relative to the prior art, the intention is to improve the heat-and-humidity resistance of polyamide bonds.

The object is preferably to be achieved by means of a reactive adhesive film system consisting of two reactive adhesive films which can be cured by being brought into contact with one another.

The reactive adhesive film or the reactive adhesive film system is to be simple to handle and the films are to exhibit a pressure sensitive adhesion, so that there is no slipping when it is applied to the substrates to be bonded, and more precise bonding is made possible than with the liquid 2-component polymerization adhesive systems known in the prior art.

ACHIEVEMENT OF THE OBJECT

This object is achieved by means of at least one reactive adhesive film as per the main claim, curable with a second reactive adhesive film or with a second component, where the reactive adhesive film comprises (a) a polymeric film-forming matrix, (b) at least one reactive monomer and (c) at least one reagent selected from an initiator, more particular a radical initiator, or an activator, characterized in that the at least one reactive monomer comprises an epoxide-functionalized acrylic ester or epoxide-functionalized methacrylic ester or an epoxide-functionalized vinyl compound.

The object is achieved in particular by means of a reactive adhesive film system comprising two reactive adhesive films as described above, where the first reactive adhesive film comprises a radical initiator and the second reactive adhesive film comprises an activator. The dependent claims provide advantageous developments of the reactive adhesive film, of the reactive adhesive film system, of the method for producing the same, and of the possible uses thereof.

DETAILED DESCRIPTION OF THE INVENTION

The object described above is achieved with at least one reactive adhesive film which can be cured with a second reactive adhesive film or with a second component. The reactive adhesive film or, where appropriate, the reactive adhesive films comprises or comprise (a) a polymeric film-forming matrix, (b) at least one reactive monomer and (c) at least one reagent selected from an initiator, more particular a radical initiator, or an activator, characterized in that the at least one reactive monomer comprises an epoxide-functionalized acrylic ester or epoxide-functionalized methacrylic ester or an epoxide-functionalized vinyl compound.

In one embodiment according to the invention a reactive adhesive film system is provided, comprising two reactive adhesive films A and B, which is characterized in that the first reactive adhesive film A of the invention comprises an initiator, more particularly a radical initiator, and a second reactive adhesive film B of the invention comprises an activator.

In a further embodiment in accordance with the invention a method is disclosed for producing a reactive adhesive film of the invention, where the method comprises the following steps:
1. dissolving and/or finely distributing the ingredients in one or more solvents and/or water,
2. mixing the dissolved or finely distributed ingredients,
3. coating a release liner or release paper, a backing material or a pressure sensitive adhesive, present in film form, with the mixture of dissolved or distributed ingredients according to step 2,
4. evaporating the solvent and/or water, and
5. optionally winding the reactive adhesive film into a roll, where the ingredients comprise (a) a polymeric film-forming matrix, (b) at least one epoxide-functionalized, reactive (meth)acrylic ester or vinyl monomer, and (c) a reagent selected from an initiator, more particularly a radical initiator, or an activator.

Steps 1 and 2 may also take place in one step, with the ingredients thus being dissolved and/or finely distributed at the same time.

In a further embodiment in accordance with the invention a kit is disclosed for providing a two-component adhesive film system, comprising (i) at least one first reactive adhesive film of the invention, which comprises an initiator, more particularly a radical initiator, and (ii) at least one second reactive adhesive film of the invention, which comprises an activator.

In a further embodiment in accordance with the invention a composite is disclosed which is bonded by the reactive adhesive film of the invention or by the reactive adhesive film system of the invention or by the kit of the invention.

Described in detail below are the components of the adhesive films of the invention and, respectively, of the adhesive film system of the invention.

Polymeric Film-Forming Matrix

The reactive adhesive films of the invention consist in principle of a matrix, called the polymeric film-forming matrix below, which comprises the reactive monomers to be polymerized. The function of this matrix is to form an inert framework for the reactive monomers, so that they are not in liquid form and hence liable to trigger the stated problems, but instead are incorporated in a film or a foil. Easier handling is thus ensured.

Inert in this context means that the reactive monomers undergo substantially no reaction with the polymeric film-forming matrix under suitably selected conditions (e.g., at sufficiently low temperatures).

Suitable film-forming matrices for use in the present invention are thermoplastic polymers, such as, for example, polyurethanes, polyesters and copolyesters, polyamides and copolyamides, polyacrylic esters, acrylic ester copolymers, polymethacrylic esters, and methacrylic ester copolymer. Chemically or physically crosslinked substances of the above-mentioned compounds are likewise conceivable. Furthermore, blends of different thermoplastic polymers may also be used. Additionally conceivable as the polymeric film-forming matrix are elastomers, thermoplastic elastomers and thermosets, alone or in a mixture.

Preferred are thermoplastic polyurethanes, especially semicrystalline representatives. Particularly preferred are thermoplastic polymers having a crystalline melting temperature of less than 100° C. and softening temperatures of likewise less than 100° C. In this connection the term "softening point" denotes the temperature beyond which the thermoplastic pellets bond to themselves. If the constituent of the polymeric film-forming matrix is a semicrystalline thermoplastic polymer, then very preferably, in addition to its softening temperature (which is associated with the melting of the crystallites), it has a glass transition temperature of at most 25° C., preferably at most 0° C.

In one preferred embodiment according to the invention, a thermoplastic polyurethane is used. The thermoplastic polyurethane preferably possesses a softening temperature of less than 100° C., more particularly less than 80° C.

In a particularly preferred embodiment according to the invention, the polymeric film-forming matrix used comprises Desmomelt® 530, which is available commercially from Covestro AG, 51373 Leverkusen, Germany. Desmomelt® 530 is a hydroxyl-terminated, largely linear, thermoplastic polyurethane elastomer with a high degree of crystallization.

The amount of the polymeric film-forming matrix in the invention is in the range from about 10 to 90% by weight, preferably about 20 to 50% by weight, based on the total mixture of the constituents of one of the reactive adhesive films of the invention. More preferably 25 to 45% by weight, most preferably about 30 to 40% by weight, of the polymeric film-forming matrix is used, based on the total mixture of the constituents of one of the reactive adhesive films of the invention. Here, the total mixture of the constituents of one of the reactive adhesive films of the invention denotes the total amount used of the polymeric film-forming matrix (a), of the reactive monomers (b), of the reagent (c) and of further components present optionally, which is obtained as the total (in % by weight).

Reactive Monomer

As used herein, the reactive monomer is intended to denote a monomer which in particular is amenable to a radical chain polymerization.

In the invention the reactive monomer is an epoxide-functionalized acrylic ester or an epoxide-functionalized methacrylic ester or an epoxide-functionalized vinyl compound. Epoxide-functionalized means that the monomer contains one or more epoxide groups, also called Oxiran rings, and hence that one or more epoxide groups are bonded chemically to the monomer molecule.

In one preferred embodiment the reactive monomer is an acrylic ester functionalized with one or more cycloaliphatic epoxide groups, or a methacrylic ester functionalized with one or more cycloaliphatic epoxide groups, or a vinyl compound functionalized with one or more cycloaliphatic epoxide groups. A cycloaliphatic epoxide group is an epoxide group which is bonded to an aliphatic ring in such a way that the two carbon atoms of the epoxide ring are also part of the aliphatic ring.

In a particularly preferred embodiment the reactive monomer is 3,4-epoxycyclohexylmethyl acrylate (CAS No.: 64630-63-3) or 3,4-epoxycyclohexylmethyl methacrylate (CAS No.: 82428-30-6) or 1,2-epoxy-4-vinylcyclohexane (CAS No.: 106-86-5). The most preferred is 3,4-epoxycyclohexylmethyl methacrylate (CAS No.: 82428-30-6), available under the tradename TTA15 from Jiangsu Tetrachem Co., Ltd.

Available from the same company is 3,4-epoxycyclohexylmethyl acrylate under the tradename TTA16, and 1,2-epoxy-4-vinylcyclohexane under the tradename TTA11.

Besides the reactive monomers selected in accordance with the invention, the reactive adhesive films of the invention may comprise further reactive monomers. These may be, for example, further (meth)acrylic monomers or vinyl compounds, more particularly nitrogen-containing vinyl compounds, and/or other monomeric, oligomeric or polymeric compounds having carbon-carbon double bond(s).

Examples of further reactive monomers are as follows:

4-acryloylmorpholine, 4-methacryloylmorpholine, 2-hydroxy-3-phenoxy-propyl acrylate (CAS No.: 16969-10-1), 2-hydroxy-3-phenoxy-propyl methacrylate, (5-ethyl-1,3-dioxan-5-yl)methyl acrylate, cyclohexyl methacrylate, 3.3.5-trimethylcyclohexyl methacrylate, 4-(1,1-dimethylethyl)cyclohexyl methacrylate, acrylic acid, methyl acrylate, ethyl acrylate, propyl acrylate, butyl acrylate, pentyl acrylate, hexyl acrylate, methacrylic acid, methyl methacrylate, ethyl methacrylate, propyl methacrylate, butyl methacrylate, pentyl methacrylate, hexyl methacrylate, phenyl acrylate, benzyl acrylate, methyl-substituted phenyl acrylates, methyl-substituted benzyl acrylates, phenyl methacrylate, benzyl methacrylate, methyl-substituted phenyl methacrylates, methyl-substituted benzyl methacrylates, hydroxyethyl acrylate, hydroxypropyl acrylate, hydroxybutyl acrylate, methoxyethyl acrylate, methoxypropyl acrylate, methoxybutyl acrylate, ethoxyethyl acrylate, ethoxypropyl acrylate, ethoxybutyl acrylate, phenoxyethyl acrylate, hydroxyethyl methacrylate, hydroxypropyl methacrylate, hydroxybutyl methacrylate, methoxyethyl methacrylate, methoxypropyl methacrylate, methoxybutyl methacrylate, ethoxyethyl methacrylate, ethoxypropyl methacrylate, ethoxybutyl methacrylate, phenoxyethyl methacrylate, in each case in all isomeric forms, tetrahydrofurfuryl acrylate, tetrahydrofurfuryl methacrylate, a poly(ethylene glycol) phenyl ether methacrylate of the general formula (I):

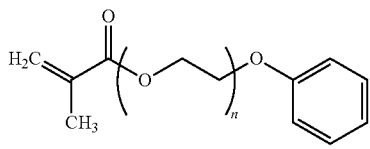

where n is 2 to 10, a poly(ethylene glycol) phenyl ether methacrylate with single or multiple alkyl substitution on the phenyl group of the general formula (II):

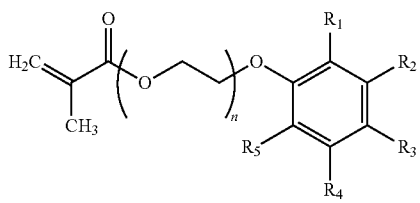

where n is 2 to 10; and $R_1$, $R_2$, $R_3$, $R_4$, $R_5$ independently of one another are H or $C_1$-$C_{14}$ alkyl, a poly(ethylene glycol) phenyl ether acrylate of the general formula (III):

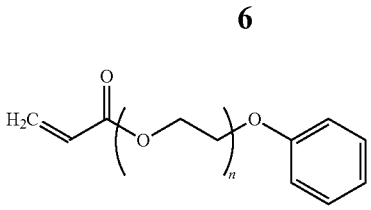

where n is 2 to 10, a poly(ethylene glycol) phenyl ether acrylate with single or multiple alkyl substitution on the phenyl group of the general formula (IV):

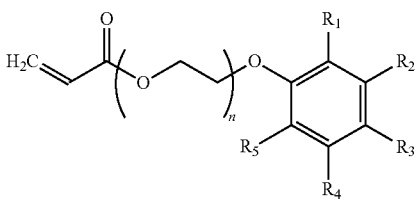

where n is 2 to 10; and $R_1$, $R_2$, $R_3$, $R_4$, $R_5$ independently of one another are H or $C_1$-$C_{14}$ alkyl.

The total fraction of the epoxide-functionalized acrylic ester or of the epoxide-functionalized methacrylic ester or of the epoxide-functionalized vinyl compound of the invention in all of the reactive monomers present in one of the reactive adhesive films of the invention is at least 1.0 percent by weight, preferably at least 2.0 percent by weight, more preferably at least 5.0 percent by weight.

The amount of the reactive monomer/monomers in the invention is in the range of about 10-90% by weight, preferably about 40-70% by weight, based on the total mixture of the constituents of one of the reactive adhesive films of the invention. Used most preferably is about 45-65% by weight of the reactive monomer/monomers, based on the total mixture of the constituents of one of the reactive adhesive films. Here, the total mixture of the constituents of one of the reactive adhesive films of the invention denotes the total amount used of the polymeric film-forming matrix (a), of the reactive monomers (b), of the reagent (c) and of further components, present optionally, which is obtained as the total (in % by weight).

Initiator, More Particularly Radical Initiator

As used herein, the term initiator, more particularly radical initiator or radical-forming substance (or else curing agent), denotes a compound which is able to initiate a polymerization reaction or crosslinking of the adhesive. However, the initiator, more particularly radical initiator, plays a very small part in the reaction events and so does not form a polymer component which determines the properties of the adhesive bond.

In the present invention an initiator, more particularly a radical initiator, is added to the first reactive adhesive film of the invention.

Radical initiators are preferred. Any radical initiators known in the prior art may be used. Preferred radical initiators are peroxides, hydroperoxides and azo compounds.

In a particularly preferred embodiment according to the invention the radical initiator is an organic peroxide. Particular preference is given to hydroperoxides, more particularly diisopropyl benzene hydroperoxide (CAS No. 26762-93-6). Diisopropyl benzene hydroperoxide is used preferably in the form of a 50% by weight solution of diisopropyl hydroperoxide in diisopropyl benzene, available under the tradename Peroxan® IHP-50 from Pergan GmbH in 46395 Bocholt, Germany. α,α-dimethylbenzyl hydroperoxide, which is also known as cumene hydroperoxide (CAS No. 80-15-9), may likewise be used. Additionally it is also possible, for example, to use p-menthane hydroperoxide (CAS No. 26762-92-5), tert-amyl hydroperoxide (CAS No. 3425-61-4) or 1,1,3,3-tetramethylbutyl hydroperoxide (CAS No. 5809-08-5).

The amount of the radical initiator in the invention is in the range from about 1 to 10% by weight, preferably about 2 to 8% by weight, based on the total mixture of the constituents of the first reactive adhesive film of the invention. Used most preferably is about 3 to 6% by weight of radical initiator, based on the total mixture of the constituents of the first reactive adhesive film of the invention. Here, the total mixture of the constituents of one of the reactive adhesive films of the invention denotes the total amount used of the polymeric film-forming matrix (a), of the reactive monomers (b), of the reagent (c) and of further components, present optionally, which is obtained as the total (in % by weight).

Activator

As used herein, the term activator denotes a compound which even at very low concentrations actually enables or accelerates the process of polymerization. Activators may also be called accelerators or accelerants.

In the present invention an activator is added to the second reactive adhesive film of the invention.

Suitable activators for use in the present invention, if a radically polymerizable system is to be activated, are selected, for example, from the group consisting of a dihydropyridine derivative or a transition metal complex, more particularly a transition metal-phthalocyanine complex.

In one embodiment according to the invention the activator is 3,5-diethyl-1,2-dihydro-1-phenyl-2-propylpyridine (also called PDHP, CAS No. 34562-31-7).

One preferred embodiment according to the invention uses a complex compound having an iron, manganese or cobalt cation as central atom and a phthalocyanine anion as ligand. The iron, manganese or cobalt cation has a double positive charge in the complex compound, while the phthalocyanine anion has a double negative charge. The iron, manganese or cobalt cation replaces two hydrogen atoms in the complex compound that were carried by the ligand on the nitrogen atoms prior to the reaction to form the complex compound.

The phthalocyanine ligands may optionally carry substituents in place of the H atoms bonded to the carbon atoms. In that case they are said to be derivatives of these compounds. Suitable substituents are selected from the group consisting of fluorine, chlorine, bromine, iodine, methyl, ethyl, propyl, isopropyl, butyl, tert-butyl, —OH, —NH$_2$, —NO$_2$.

One particularly suitable activator comprises iron(II) phthalocyanine (CAS No. 132-16-1), manganese(II) phthalocyanine (CAS No. 14325-24-7), or cobalt(II) phthalocyanine (CAS No. 3317-67-7). The most preferred activator used is iron(II) phthalocyanine (CAS No. 132-16-1), available from Chemos GmbH in 93128 Regenstauf, Germany.

The amount of the activator in the invention is in the range from greater than 0 to about 10% by weight, preferably about 0.1-5.0% by weight, based on the total mixture of the constituents of the second reactive adhesive film of the invention. Used most preferably is about 0.2-3.0% by weight, more preferably 0.5-2.0% by weight, of activator, based on the total mixture of the constituents of the second reactive adhesive film of the invention.

Here, the total mixture of the constituents of one of the reactive adhesive films of the invention denotes the total amount used of the polymeric film-forming matrix (a), of the reactive monomers (b), of the reagent (c) and of further components, present optionally, which is obtained as the total (in % by weight).

Crosslinker

As used herein, the term crosslinker denotes chemical compounds which are capable of providing reactive, functional groups to linear molecular chains so that three-dimensionally crosslinked structures are able to form from the two-dimensional structures, with formation of intermolecular bridges.

Typical examples of crosslinkers are chemical compounds which within the molecule or at the two ends of the molecule have two or more identical or different functional groups and consequently are able to crosslink molecules of the same or else different structures with one another. Unlike the activator, as described above, a crosslinker is incorporated into the polymer network.

Preferred crosslinkers are diacrylates, dimethacrylates, triacrylates, trimethacrylates, tetraacrylates, tetramethacrylates, higher polyfunctional acrylates and/or higher polyfunctional methacrylates.

Preferred crosslinkers are hence at the same time also reactive monomers.

Crosslinkers used in particularly preferred embodiments according to the invention are ethylene glycol dimethacrylate (CAS No.: 97-90-5), polyethylene glycol dimethacrylates (CAS No.: 25852-47-5), trimethyloylpropane triacrylate (CAS No.: 15625-89-5), trimethylolpropane trimethacrylate (CAS No.: 3290-92-4), trimethyloylpropane propoxylate triacrylate (CAS No.: 53879-54-2), di(trimethylolpropane) tetraacrylate (CAS No.: 94108-97-1), bisphenol A glycerolate dimethacrylate (BIS-GMA, CAS No.: 1565-94-2) and/or bisphenol A dimethacrylate (BIS-DMA, CAS No.: 3253-39-2).

Further Constituents of the Reactive Adhesive Films

The reactive adhesive films of the present invention may optionally comprise further additives and/or auxiliaries which are known in the prior art. Examples of these include fillers, dyes, nucleating agents, rheological additives (for example, fumed silica), expandants, adhesion-enhancing additives (adhesion promoters, especially silanes, tackifier resins), compounding agents, plasticizers and/or antiaging agents, light stabilizers and UV stabilizers, in the form for example of primary and secondary antioxidants. The further constituents of the reactive adhesive films of the invention may at the same time also be reactive monomers. This may be the case with particular preference for the silane adhesion promoters. Used preferably in this context is 3-trimethoxysilylpropyl methacrylate (CAS No.: 2530-85-0), available under the tradename Dynasylan®MEMO from Evonik AG, Rellinghauser Straße 1-11, 45128 Essen, Germany.

Reactive Adhesive Film

As used herein the term "adhesive film" (or else adhesive layer or adhesive foil) is intended to encompass a completely or incompletely provided application of the respective mixture of components, as described below. Thus, for example, a dotwise application of the adhesive components that does not completely cover the substrate surface(s) where bonding is to take place may likewise result in a permanent bond in the sense of the present invention.

In one preferred embodiment according to the invention the at least one reactive adhesive film, curable with a second reactive adhesive film or with a second component, comprises a mixture of the following constituents: thermoplastic polyurethane, more particularly Desmomelt® 530, 3,4-epoxycyclohexylmethyl methacrylate (CAS No.: 82428-30-6), trimethyloylpropane propoxylate triacrylate (CAS No.: 53879-54-2), 3-trimethoxysilylpropyl methacrylate (CAS No.: 2530-85-0) and diisopropylbenzene hydroperoxide.

Each of the preferred embodiments according to the invention contains about 10 to 90% by weight of thermoplastic polyurethane, about 10 to 90% by weight of reactive monomer(s) and about 1 to 10% by weight of diisopropylbenzene hydroperoxide, preferably about 20 to 50% by weight of thermoplastic polyurethane, about 40 to 70% by weight of reactive monomer(s) and about 2 to 8% by weight of diisopropylbenzene hydroperoxide, based on the total mixture of the constituents of the at least one first reactive adhesive film A of the invention.

In another preferred embodiment according to the invention the at least one reactive adhesive film, curable with a second component or with a second reactive adhesive film, comprises a mixture of the following constituents: thermoplastic polyurethane, more particularly Desmomelt® 530, 3,4-epoxycyclohexylmethyl methacrylate (CAS No.: 82428-30-6), trimethyloylpropane propoxylate triacrylate (CAS No.: 53879-54-2), 3-trimethoxysilylpropyl methacrylate (CAS No.: 2530-85-0) and iron(II)phthalocyanine.

Each of the preferred embodiments according to the invention contains about 10 to 90% by weight of thermoplastic polyurethane, about 10 to 90% by weight of reactive monomer(s) and greater than 0 to about 10% by weight of iron(II)phthalocyanine, preferably about 20 to 50% by weight of thermoplastic polyurethane, about 40 to 70% by weight of reactive monomer(s) and about 0.1 to 5% by weight of iron(II)phthalocyanine, based on the total mixture of the constituents of the at least one second reactive adhesive film B of the invention.

As used herein the total mixture of the constituents of the reactive adhesive films of the invention refers to the total amount used of the polymeric film-forming matrix (a), of the reactive monomers/monomer (b), of the reagent (c) and of further components present optionally, which is obtained as the total (in % by weight).

The reactive adhesive films of the invention generally possess a layer thickness in the range from about 20 to 200 µm, preferably about 30 to 100 µm, more preferably about 40 to 60 µm and very preferably about 50 µm. To produce greater layer thicknesses it may be advantageous to laminate a plurality of adhesive film layers together.

The reactive adhesive films of the invention are characterized, moreover, in that they preferably possess properties of pressure sensitive adhesion. Pressure sensitive adhesive substances are defined according to Römpp (Römpp Online 2013, document identifier RD-08-00162), as viscoelastic adhesives whose set, dry film at room temperature is permanently tacky and remains adhesive. Pressure sensitive adhesion occurs through gentle contact pressure immediately on almost all substrates. Gentle contact pressure here means a contact pressure of greater than 0 bar which is exerted for a duration of greater than 0 seconds.

Reactive Adhesive Film System

In the invention the first and second reactive adhesive films, as described above, are employed for a reactive adhesive film system which is characterized in that the first reactive adhesive film A, as well as comprising the film-forming matrix (a) and at least one reactive monomer (b), comprises an initiator (c), more particularly a radical initiator, and the second reactive adhesive film B, as well as comprising the film-forming matrix (a) and at least one reactive monomer (b), comprises an activator (c). The activator used is preferably iron(II) phthalocyanine.

Also provided in the invention is a reactive adhesive film system comprising two or more reactive adhesive films as defined above, characterized in that the first reactive adhesive film A comprises an initiator, more particular a radical initiator, and a second reactive adhesive film B comprises an activator, and these two reactive adhesive films A and B are each present alternately.

In one variant the reactive adhesive film system comprises a reactive adhesive film A, which as well as comprising the film-forming matrix (a) and at least one reactive monomer (b) comprises an initiator (c), more particularly a radical initiator, and a component B, comprising an activator, as described above. The component B may be a film, a substance, mixture of substances, or a solid or liquid preparation which comprises at least one activator, or the activator itself.

In another variant the reactive adhesive film system comprises a reactive adhesive film B, which as well as comprising the film-forming matrix (a) and at least one reactive monomer (b) comprises an activator (c), preferably iron(II)phthalocyanine, and a component A, comprising an initiator, more particularly a radical initiator, as described above. The component A may be a film, a substance, mixture of substances, or a solid or liquid preparation which comprises at least one initiator, more particularly a radical initiator, or the initiator, more particularly radical initiator, itself.

The reactive adhesive films are cured by contacting adhesive film A with adhesive film B or with component B, or by contacting adhesive film B with adhesive film A or with component A, respectively.

The contacting is made over a wide area under moderate pressure, more particularly at 0.5 to 3 bar, at room temperature (23° C.). Higher or lower temperatures and pressures, electively, are also possible. The stated moderate pressure is more particularly to be readily achievable by hand. In the invention, the contact time at room temperature is from a few seconds to a few minutes, preferably 10 to 60 seconds. The pressure may be applied mechanically or manually.

If the two reactive adhesive films A and B, as described above, are applied beforehand to the substrates where bonding is to take place, the above-described curing and optionally crosslinking produce a permanent bonding of the substrates. Alternatively, adhesive film A may also be applied to one substrate where bonding is to take place, and component B to the other substrate where bonding is to take place. In a further alternative, component A may also be applied to one substrate where bonding is to take place, and adhesive film B to the other substrate where bonding is to take place.

In a further alternative procedure, first adhesive film A is applied to one substrate where bonding is to take place, and adhesive film B or a component B is applied to adhesive film A. Then the other substrate where bonding is to take place is applied to adhesive film B or component B, respectively. Instead of adhesive film A it is also possible first for component A to be applied to one substrate where bonding is to take place, and adhesive film B to be applied to component A.

In a further alternative, it is also possible first to apply adhesive film B to one substrate where bonding is to take place, and to apply adhesive film A or a component A to adhesive film B. Subsequently the second substrate where bonding is to take place is applied to adhesive film A or component A, respectively. Instead of adhesive film B, it is also possible first for component B to be applied to one substrate where bonding is to take place, and adhesive film A to be applied to component B.

Furthermore, the reactive adhesive film system of the invention may comprise further films, layers, adhesives and also permanent and/or temporary backings.

Suitable backing materials are known to a person skilled in the art. Examples of permanent backings that may be used are films (polyesters, PET, PE, PP, BOPP, PVC, polyimides), nonwovens, foams, woven fabrics and/or fabric foils. Temporary backings ought to be provided with a release layer, in which case the release layer generally consists of a silicone release varnish or fluorinated release varnish or is polyolefinic in nature (HDPE, LDPE).

It may optionally be necessary for the surfaces of the substrates where bonding is to take place to be pretreated by means of a physical, chemical and/or physico-chemical process. Advantageous here, for example, is the application of a primer or of an adhesion promoter composition.

Substrates

Suitable substrates suitable for bonding with the reactive adhesive film or the reactive adhesive film system of the invention are metals, glass, concrete, stone, ceramic, textile and/or plastics. Substrates to be bonded may be identical or different.

The reactive adhesive film of the invention or the reactive adhesive film system of the invention is used preferably for bonding metals, glass and plastics. Bonded with particular preference are polycarbonate, polyamide or anodized aluminum.

The metal substrates for bonding may be fabricated generally from all common metals and metal alloys. Metals are used preferably such as, for example, aluminum, stainless steel, steel, magnesium, zinc, nickel, brass, copper, titanium, ferrous metals and alloys. The parts to be bonded may also be constructed of different metals.

Examples of suitable plastics substrates are acrylonitrile-butadiene-styrene copolymers (ABS), polycarbonates (PC), ABS/PC blends, PMMA, polyamides, glass fiber-reinforced polyamides, polyvinyl chloride, polyvinylene fluoride, cellulose acetate, cycloolefin copolymers, liquid-crystal polymers (LCPs), polylactide, polyetherketones, polyetherimide, polyethersulfone, polymethacryloylmethylimide, polymethylpentene, polyphenyl ether, polyphenylene sulfide, polyphthalamide, polyurethanes, polyvinyl acetate, styrene-acrylonitrile copolymers, polyacrylates and polymethacrylates, polyoxymethylene, acrylic ester-styrene-acrylonitrile copolymers, polyethylene, polystyrene, polypropylene and/or polyesters, such as, for example, polybutylene terephthalates (PBT) and/or polyethylene terephthalate (PET).

Substrates may have been painted, printed, vapor-coated or coated by sputtering.

The substrates to be bonded may adopt any desired form which is necessary for the use of the resultant composite. In their simplest form, the substrates are planar. It is also possible, moreover, for three-dimensional substrates, with inclination, for example, to be bonded with the reactive adhesive film system of the invention. The substrates to be bonded may also have a very wide variety of different functions—such as, for example, housings, viewing windows, stiffening elements, etc.

Method for Producing a Reactive Adhesive Film

The reactive adhesive films of the invention are produced by the method described below:

In a first step the ingredients are dissolved or finely distributed in one or more solvents and/or water. Alternatively no solvent and/or water is necessary, because the ingredients are already completely soluble in one another (optionally under the action of heat and/or shearing). Suitable solvents are known in the art, and solvents in which at least one of the ingredients has a good solubility are used preferably. Acetone is particularly preferred.

The term ingredient as used herein encompasses the polymeric film-forming matrix, at least one reactive monomer, a reagent selected from an initiator, more particularly a radical initiator, or an activator, and also, optionally, further additives and/or auxiliaries, as defined above.

The dissolved or finely distributed ingredients are subsequently mixed in a second step. The mixture is produced using customary stirring devices. The solution, optionally, is also heated. The ingredients are optionally dissolved or finely distributed and mixed at the same time.

Subsequently, in a third step, a release liner, a release paper, a backing material or a pressure sensitive adhesive is coated with a mixture of the dissolved or finely distributed ingredients according to step 2. Coating takes place according to the customary techniques, which are known in the art.

After the coating operation, the solvent is removed by evaporation in a fourth step.

The reactive adhesive film may optionally be wound into a roll in a further step.

For storage, the reactive films of the invention are lined with a release liner or release paper.

Alternatively, the reactive adhesive films of the invention are produced solventlyless by extrusion, hotmelt die coating or calendering.

Kit for Providing a Reactive Two-Component Adhesive System in Film Form According to the Invention The invention further provides a kit for providing a reactive two-component adhesive system in film form. This kit comprises at least one first reactive adhesive film A, which comprises an initiator, more particularly a radical initiator, as described above, and at least one second reactive adhesive film B, which comprises an activator, as described above.

The kit of the invention is typically used as follows:

The at least one first reactive adhesive film A is applied to a surface of a substrate to be bonded. Moreover, the at least one second reactive adhesive film B is applied to a surface of a second substrate to be bonded. Adhesive film A and adhesive film B are brought into contact and left in contact for pressing times in the range from a few seconds through several minutes at room temperature (23° C.), thereby initiating the polymerization reaction and curing the adhesive. As an alternative it is also possible for the at least one second adhesive film B to be applied to the first adhesive film A and only then for the surface of a second substrate to be bonded to be applied thereto.

The method described above may optionally be repeated so as to achieve a substrate-A-B-A-B-substrate or substrate-B-A-B-substrate or substrate-A-B-A-substrate bonding of the layers, etc. This may be advantageous if the substrates to be bonded and the first and second adhesive films A and B have different pronounced adhesion properties.

Composite

Provided lastly, in the invention, is a composite bonded by means of the reactive adhesive film or the reactive adhesive film system, as defined above, or by the kit of the invention, as defined above.

Product Properties

The reactive adhesive film of the invention or the reactive adhesive film system of the invention, comprising two reactive adhesive films, exhibits outstanding product properties such as could not have been foreseen even by a person skilled in the art.

Generally high bond strengths are achieved. Bonds of polyamide lead to the surprising outcome that the bond strength increases significantly by comparison with the fresh value after a heat-and-humidity treatment of the already cured bond. This outcome represents a significant improvement over the prior art, in particular. In push-out tests, after a three-day heat-and-humidity treatment (60° C./95% relative humidity) of the cured bond in polyamide-to-polycarbonate test specimens, values of around 6 MPa are achieved in some cases (see examples). No such outcomes have hitherto been reported in connection with reactive adhesive film systems. In the case of bonds in polycarbonate-to-polycarbonate test specimens, values of greater than 7 MPa are achieved in some cases (see examples), and for bonds of anodized aluminum to polycarbonate, values of more than 4 MPa are achieved (see examples). Reactive monomers other than those selected in accordance with the invention were likewise tested. With these noninventive monomers, only very low bond strengths were achieved for polyamide bonds (see comparative examples).

Experimental Section

The examples which follow serve to illustrate the present invention, but should not be interpreted as limiting the scope of protection in any way.

Preparing a Solution of Film-Forming Matrix

Polyurethane (PU) Solution:

A 20% solution of the film-forming polymer in acetone is prepared by first weighing out 120 g of Desmomelt® 530 and 480 g of acetone into a screw-top jar and closing the jar.

The Desmomelt® 530 is dissolved completely by rolling the screw-top jar on a roller bench for several days. The operation lasts about one to seven days, depending on the rolling speed. Alternatively the acetonic solution may also be prepared by stirring the Desmomelt® 530 granules into acetone by means of a commercial laboratory stirrer.

Example 1

Producing the First Reactive, Pressure Sensitive Adhesive Film A Comprising a Radical Initiator 172.95 g of the 20% solution of Desmomelt® 530 in acetone (PU solution) are mixed with 46.18 g of 3,4-epoxycyclohexylmethyl methacrylate (TTA®15), 2.95 g of trimethyloylpropane propoxylate triacrylate, 0.99 g of 3-trimethoxysilylpropyl methacrylate (Dynasylan MEMO), 9.83 g of Peroxan® IHP-50 and 10.37 g of Aerosil® R202 (hydrophobized fumed silica, Evonik Industries AG) by means of a commercial laboratory stirrer for 60 minutes.

The homogeneous mixture obtained is applied to a siliconized polyester foil (release liner) by means of a commercial laboratory coating table (for example, from SMO (Sondermaschinen Oschersleben GmbH)) having a coating knife. The acetone is then evaporated off in a forced-air drying cabinet at 60° C. for 10 minutes. The gap width during coating is adjusted such that evaporation of the solvent gives a film 50 μm thick. The pressure sensitive adhesive reactive film A obtained, prior to bonding, is lined with a second siliconized polyester foil (release liner) and stored.

Producing the Second Reactive, Pressure Sensitive Adhesive Film B Comprising an Activator 183.15 g of the 20% solution of Desmomelt® 530 in acetone (PU solution) are mixed with 47.34 g of 3,4-epoxycyclohexylmethyl methacrylate (TTA®15), 3.02 g of trimethyloylpropane propoxylate triacrylate, 1.01 g of 3-trimethoxysilylpropyl methacrylate (Dynasylan MEMO), 1.01 g of iron(II) phthalocyanine and 10.99 g of Aerosil® R202 (hydrophobized fumed silica, Evonik Industries AG) by means of a commercial laboratory stirrer for 60 minutes.

The homogeneous mixture obtained is applied to a siliconized polyester foil by means of a commercial laboratory coating table (for example, from SMO having a coating knife. The acetone is then evaporated off in a forced-air drying cabinet at 60° C. for 10 minutes. The gap width during coating is adjusted such that evaporation of the solvent gives a film 50 μm thick. The pressure sensitive adhesive film B obtained, prior to bonding, is lined with a second siliconized polyester foil (release liner) and stored.

The percentage compositions of the reactive adhesive films A and B and also the initial weighings for preparing the preceding solutions are set out in the table below:

Example 1, Solution and Reactive Adhesive Film A

| Raw material | % by weight solids* | Initial weighing (g) with solvent |
|---|---|---|
| Desmomelt ® 530 | 34.59 | |
| Desmomelt ® 530 solution in acetone (20% by weight Desmomelt ® 530 in acetone) | | 172.95 |
| 3,4-Epoxycyclohexylmethyl methacrylate (TTA ® 15) | 46.18 | 46.18 |
| Trimethyloylpropane propoxylate triacrylate | 2.95 | 2.95 |
| (Dynasylan ® MEMO)** | 0.99 | 0.99 |
| Diisopropyl hydroperoxide | 4.92 | |
| Peroxan ® IHP-50*** | | 9.84 |
| Aerosil ® R 202**** | 10.37 | 10.37 |
| Total | 100.00 | 243.28 |

*Solids here are all substances which are not solvents. Solvents here are acetone and diisopropylbenzene.
**3-Trimethoxysilylpropyl methacrylate, Evonik
***50% by weight solution of diisopropyl hydroperoxide in diisopropylbenzene, Pergan
****hydrophobized fumed silica, Evonik Example 1, Solution and Reactive Adhesive Film B

| Raw material | % by weight solids* | Initial weighing (g) with solvent |
|---|---|---|
| Desmomelt ® 530 | 36.63 | |
| Desmomelt ® 530 solution in acetone (20% by weight Desmomelt ® 530 in acetone) | | 183.15 |
| 3,4-Epoxycyclohexylmethyl methacrylate (TTA ® 15) | 47.34 | 47.34 |
| Trimethyloylpropane propoxylate triacrylate | 3.02 | 3.02 |
| (Dynasylan ® MEMO)** | 1.01 | 1.01 |
| Iron(II) phthalocyanine | 1.01 | 1.01 |
| Aerosil ® R 202*** | 10.99 | 10.99 |
| Total | 100.00 | 246.52 |

*Solids here are all substances which are not solvents. The solvent here is acetone.
**3-trimethoxysilylpropyl methacrylate, Evonik
***hydrophobized fumed silica, Evonik In an analogous way to that in example 1, the solutions and reactive adhesive films A and B of the further inventive and comparative examples are produced.

The tables which follow provide information on the compositions of the solutions and reactive adhesive films A and B in the further inventive and comparative examples.

Example 2, Solution and Reactive Adhesive Film A

| Raw material | % by weight solids* | Initial weighing (g) with solvent |
|---|---|---|
| Desmomelt ® 530 | 35.59 | |
| Desmomelt ® 530 solution in acetone (20% by weight Desmomelt ® 530 in acetone) | | 177.94 |
| 3,4-Epoxycyclohexylmethyl methacrylate (TTA ® 15) | 47.51 | 47.51 |
| Polyethylene glycol dimethacrylate (550)** | 1.17 | 1.17 |
| Diisopropyl hydroperoxide Peroxan ® IHP-50*** | 5.06 | 10.12 |
| Aerosil ® R 202**** | 10.67 | 10.67 |
| Total | 100.00 | 247.41 |

*Solids here are all substances which are not solvents. Solvents here are acetone and diisopropylbenzene.
**number-averaged mean molar mass Mn = 550, CAS: 25852-47-5
***50% by weight solution of diisopropyl hydroperoxide in diisopropylbenzene, Pergan
****hydrophobized fumed silica, Evonik

Example 2, Solution and Reactive Adhesive Film B

| Raw material | % by weight solids* | Initial weighing (g) with solvent |
|---|---|---|
| Desmomelt ® 530 | 37.71 | |
| Desmomelt ® 530 solution in acetone (20% by weight Desmomelt ® 530 in acetone) | | 188.56 |
| 3,4-Epoxycyclohexylmethyl methacrylate (TTA ® 15) | 48.74 | 48.74 |
| Polyethylene glycol dimethacrylate (550)** | 1.19 | 1.19 |
| Iron(II) phthalocyanine | 1.04 | 1.04 |
| Aerosil ® R 202*** | 11.32 | 11.32 |
| Total | 100.00 | 250.85 |

*Solids here are all substances which are not solvents. The solvent here is acetone.
**number-averaged mean molar mass Mn = 550, CAS: 25852-47-5
***hydrophobized fumed silica, Evonik

Example 3, Solution and Reactive Adhesive Film A

| Raw material | % by weight solids* | Initial weighing (g) with solvent |
|---|---|---|
| Desmomelt ® 530 | 34.59 | |
| Desmomelt ® 530 solution in acetone (20% by weight Desmomelt ® 530 in acetone) | | 172.95 |
| 3,4-Epoxycyclohexylmethyl methacrylate (TTA ® 15) | 23.09 | 23.09 |
| 2-Hydroxy-3-phenoxypropyl acrylate | 23.09 | 23.09 |
| Trimethyloylpropane propoxylate triacrylate | 2.95 | 2.95 |
| (Dynasylan ® MEMO)** | 0.99 | 0.99 |
| Diisopropyl hydroperoxide Peroxan ® IHP-50*** | 4.92 | 9.84 |
| Aerosil ® R 202**** | 10.37 | 10.37 |
| Total | 100.00 | 243.28 |

*Solids here are all substances which are not solvents. Solvents here are acetone and diisopropylbenzene.
**3-trimethoxysilylpropyl methacrylate, Evonik
***50% by weight solution of diisopropyl hydroperoxide in diisopropylbenzene, Pergan
****hydrophobized fumed silica, Evonik

Example 3, Solution and Reactive Adhesive Film B

| Raw material | % by weight solids* | Initial weighing (g) with solvent |
|---|---|---|
| Desmomelt ® 530 | 36.63 | |
| Desmomelt ® 530 solution in acetone (20% by weight Desmomelt ® 530 in acetone) | | 183.15 |
| 3,4-Epoxycyclohexylmethyl methacrylate (TTA ® 15) | 23.67 | 23.67 |
| 2-Hydroxy-3-phenoxypropyl acrylate | 23.67 | 23.67 |
| Trimethyloylpropane propoxylate triacrylate | 3.02 | 3.02 |
| (Dynasylan ® MEMO)** | 1.01 | 1.01 |
| Iron(II) phthalocyanine | 1.01 | 1.01 |
| Aerosil ® R 202*** | 10.99 | 10.99 |
| Total | 100.00 | 246.52 |

*Solids here are all substances which are not solvents. The solvent here is acetone.
**3-trimethoxysilylpropyl methacrylate, Evonik
***hydrophobized fumed silica, Evonik

Example 4, Solution and Reactive Adhesive Film A

| Raw material | % by weight solids* | Initial weighing (g) with solvent |
|---|---|---|
| Desmomelt ® 530 | 35.35 | |
| Desmomelt ® 530 solution in acetone (20% by weight Desmomelt ® 530 in acetone) | | 176.75 |
| 3,4-Epoxycyclohexylmethyl methacrylate (TTA ® 15) | 5.05 | 5.05 |
| 2-Phenoxyethyl methacrylate | 28.28 | 28.28 |
| N-Vinylcaprolactam | 10.10 | 10.10 |
| Trimethylolpropane trimethacrylate | 3.03 | 3.03 |
| (Dynasylan ® MEMO)** | 1.01 | 1.01 |
| Cumene hydroperoxide Peroxan ® CU-90L*** | 9.09 | 10.10 |
| Aerosil ® R 202**** | 8.09 | 8.09 |
| Total | 100.00 | 242.41 |

*Solids here are all substances which are not solvents. The solvents here are acetone and cumene.
**3-trimethoxysilylpropyl methacrylate, Evonik
***90% by weight solution of cumene hydroperoxide in cumene, Pergan
****hydrophobized fumed silica, Evonik

Example 4, Solution and Reactive Adhesive Film B

| Raw material | % by weight solids* | Initial weighing (g) with solvent |
|---|---|---|
| Desmomelt ® 530 | 38.50 | |
| Desmomelt ® 530 solution in acetone (20% by weight Desmomelt ® 530 in acetone) | | 192.50 |
| 3,4-Epoxycyclohexylmethyl methacrylate (TTA ® 15) | 5.50 | 5.50 |
| 2-Phenoxyethyl methacrylate | 30.80 | 30.80 |
| N-Vinylcaprolactam | 11.00 | 11.00 |
| Trimethylolpropane trimethacrylate | 3.30 | 3.30 |
| (Dynasylan ® MEMO)** | 1.10 | 1.10 |
| Iron(II) phthalocyanine | 1.00 | 1.00 |
| Aerosil ® R 202*** | 8.80 | 8.80 |
| Total | 100.0 | 254.00 |

*Solids here are all substances which are not solvents. The solvent here is acetone.
**3-trimethoxysilylpropyl methacrylate, Evonik
***hydrophobized fumed silica, Evonik Example 5, Solution and Reactive Adhesive Film A

| Raw material | % by weight solids* | Initial weighing (g) with solvent |
|---|---|---|
| Desmomelt ® 530 | 34.59 | |
| Desmomelt ® 530 solution in acetone (20% by weight Desmomelt ® 530 in acetone) | | 172.95 |
| 3,4-Epoxycyclohexylmethyl acrylate (TTA ® 16) | 46.18 | 46.18 |
| Trimethyloylpropane propoxylate triacrylate | 2.95 | 2.95 |
| (Dynasylan ® MEMO)** | 0.99 | 0.99 |
| Diisopropyl hydroperoxide Peroxan ® IHP-50*** | 4.92 | 9.84 |
| Aerosil ® R 202**** | 10.37 | 10.37 |
| Total | 100.00 | 243.28 |

*Solids here are all substances which are not solvents. Solvents here are acetone and diisopropylbenzene.
**3-trimethoxysilylpropyl methacrylate, Evonik
***50% by weight solution of diisopropyl hydroperoxide in diisopropylbenzene, Pergan
****hydrophobized fumed silica, Evonik Example 5, Solution and Reactive Adhesive Film B

| Raw material | % by weight solids* | Initial weighing (g) with solvent |
|---|---|---|
| Desmomelt ® 530 | 36.63 | |
| Desmomelt ® 530 solution in acetone (20% by weight Desmomelt ® 530 in acetone) | | 183.15 |
| 3,4-Epoxycyclohexylmethyl acrylate (TTA ® 16) | 47.34 | 47.34 |
| Trimethyloylpropane propoxylate triacrylate | 3.02 | 3.02 |
| (Dynasylan ® MEMO)** | 1.01 | 1.01 |
| Iron(II) phthalocyanine | 1.01 | 1.01 |
| Aerosil ® R 202*** | 10.99 | 10.99 |
| Total | 100.00 | 246.52 |

*Solids here are all substances which are not solvents. The solvent here is acetone.
**3-trimethoxysilylpropyl methacrylate, Evonik
***hydrophobized fumed silica, Evonik Example 6, Solution and Reactive Adhesive Film A

| Raw material | % by weight solids* | Initial weighing (g) with solvent |
|---|---|---|
| Desmomelt ® 530 | 35.35 | |
| Desmomelt ® 530 solution in acetone (20% by weight Desmomelt ® 530 in acetone) | | 176.75 |
| 1,2-Epoxy-4-vinylcyclohexane (TTA ® 11) | 5.05 | 5.05 |
| 2-Phenoxyethyl methacrylate | 28.28 | 28.28 |
| N-Vinylcaprolactam | 10.10 | 10.10 |
| Trimethylolpropane trimethacrylate | 3.03 | 3.03 |
| (Dynasylan ® MEMO)** | 1.01 | 1.01 |
| Cumene hydroperoxide Peroxan ® CU-90L*** | 9.09 | 10.10 |
| Aerosil ® R 202**** | 8.09 | 8.09 |
| Total | 100.00 | 242.41 |

*Solids here are all substances which are not solvents. The solvents here are acetone and cumene.
**3-trimethoxysilylpropyl methacrylate, Evonik
***90% by weight solution of cumene hydroperoxide in cumene, Pergan
****hydrophobized fumed silica, Evonik Example 6, Solution and Reactive Adhesive Film B

| Raw material | % by weight solids* | Initial weighing (g) with solvent |
|---|---|---|
| Desmomelt ® 530 | 38.50 | |
| Desmomelt ® 530 solution in acetone (20% by weight Desmomelt ® 530 in acetone) | | 192.50 |
| 1,2-Epoxy-4-vinylcyclohexane (TTA ® 11) | 5.50 | 5.50 |
| 2-Phenoxyethyl methacrylate | 30.80 | 30.80 |
| N-Vinylcaprolactam | 11.00 | 11.00 |
| Trimethylolpropane trimethacrylate | 3.30 | 3.30 |
| (Dynasylan ® MEMO)** | 1.10 | 1.10 |
| Iron(II) phthalocyanine | 1.00 | 1.00 |
| Aerosil ® R 202*** | 8.80 | 8.80 |
| Total | 100.00 | 254.00 |

*Solids here are all substances which are not solvents. The solvent here is acetone.
**3-trimethoxysilylpropyl methacrylate, Evonik
***hydrophobized fumed silica, Evonik Component A as Alternative to the Reactive Adhesive Films A for Curing the Reactive Adhesive Films B in all Inventive and Comparative Examples

| Raw material | % by weight |
|---|---|
| Acetone | 90.0 |
| Peroxan ® CU-90L* | 10.0 |
| Total | 100.00 |

*90% by weight solution of cumene hydroperoxide in cumene, Pergan

Component A is applied with a brush in a thin layer directly to the open side of the reactive adhesive film B, that film having been previously adhered to one of the substrates to be bonded, and the siliconized polyester foil removed. Subsequently the other substrate is adhered thereto within five minutes.

Component B as Alternative to the Reactive Adhesive Films B for Curing the Reactive Adhesive Films A in all Inventive and Comparative Examples

| Raw material | % by weight |
|---|---|
| Isopropanol | 95.0 |
| Iron(II) phthalocyanine | 5.0 |
| Total | 100.00 |

Component B is applied with a brush in a thin layer directly to the open side of the reactive adhesive film A, that film having been previously adhered to one of the substrates to be bonded, and the siliconized polyester foil removed. Subsequently the other substrate is adhered thereto within five minutes.

COMPARATIVE EXAMPLES

Comparative Example 1, Solution and Reactive Adhesive Film A

| Raw material | % by weight solids* | Initial weighing (g) with solvent |
|---|---|---|
| Desmomelt ® 530 | 34.59 | |
| Desmomelt ® 530 solution in acetone (20% by weight Desmomelt ® 530 in acetone) | | 172.95 |
| 2-Hydroxy-3-phenoxypropyl acrylate | 46.18 | 46.18 |
| Trimethyloylpropane propoxylate triacrylate | 2.95 | 2.95 |
| (Dynasylan ® MEMO)** | 0.99 | 0.99 |
| Diisopropyl hydroperoxide | 4.92 | |
| Peroxan ® IHP-50*** | | 9.84 |
| Aerosil ® R 202**** | 10.37 | 10.37 |
| Total | 100.00 | 243.28 |

*Solids here are all substances which are not solvents. Solvents here are acetone and diisopropylbenzene.
**3-trimethoxysilylpropyl methacrylate, Evonik
***50% by weight solution of diisopropyl hydroperoxide in diisopropylbenzene, Pergan
****hydrophobized fumed silica, Evonik

Comparative Example 1, Solution and Reactive Adhesive Film B

| Raw material | % by weight solids* | Initial weighing (g) with solvent |
|---|---|---|
| Desmomelt ® 530 | 36.63 | |
| Desmomelt ® 530 solution in acetone (20% by weight Desmomelt ® 530 in acetone) | | 183.15 |
| 2-Hydroxy-3-phenoxypropyl acrylate | 47.34 | 47.34 |
| Trimethyloylpropane propoxylate triacrylate | 3.02 | 3.02 |
| (Dynasylan ® MEMO)** | 1.01 | 1.01 |
| Iron(II) phthalocyanine | 1.01 | 1.01 |
| Aerosil ® R 202*** | 10.99 | 10.99 |
| Total | 100.00 | 246.52 |

*Solids here are all substances which are not solvents. The solvent here is acetone.
**3-trimethoxysilylpropyl methacrylate, Evonik
***hydrophobized fumed silica, Evonik

Comparative Example 2, Solution and Reactive Adhesive Film A

| Raw material | % by weight solids* | Initial weighing (g) with solvent |
|---|---|---|
| Desmomelt ® 530 | 35.35 | |
| Desmomelt ® 530 solution in acetone (20% by weight Desmomelt ® 530 in acetone) | | 176.75 |
| 2-Phenoxyethyl methacrylate | 33.33 | 33.33 |
| N-Vinylcaprolactam | 10.10 | 10.10 |
| Trimethylolpropane trimethacrylate | 3.03 | 3.03 |
| (Dynasylan ® MEMO)** | 1.01 | 1.01 |
| Cumene hydroperoxide | 9.09 | |
| Peroxan ® CU-90L*** | | 10.10 |
| Aerosil ® R 202**** | 8.09 | 8.09 |
| Total | 100.00 | 242.41 |

*Solids here are all substances which are not solvents. The solvents here are acetone and cumene.
**3-trimethoxysilylpropyl methacrylate, Evonik
***90% by weight solution of cumene hydroperoxide in cumene, Pergan
****hydrophobized fumed silica, Evonik

Comparative Example 2, Solution and Reactive Adhesive Film B

| Raw material | % by weight solids* | Initial weighing (g) with solvent |
|---|---|---|
| Desmomelt ® 530 | 38.50 | |
| Desmomelt ® 530 solution in acetone (20% by weight Desmomelt ® 530 in acetone) | | 192.50 |
| 2-Phenoxyethyl methacrylate | 36.30 | 36.30 |
| N-Vinylcaprolactam | 11.00 | 11.00 |
| Trimethylolpropane trimethacrylate | 3.30 | 3.30 |
| (Dynasylan ® MEMO)** | 1.10 | 1.10 |
| Iron(II) phthalocyanine | 1.00 | 1.00 |
| Aerosil ® R 202*** | 8.80 | 8.80 |
| Total | 100.0 | 254.00 |

*Solids here are all substances which are not solvents. The solvent here is acetone.
**3-Trimethoxysilylpropyl methacrylate, Evonik
***hydrophobized fumed silica, Evonik

Comparative Example 3, Solution and Reactive Adhesive Film A

| Raw material | % by weight solids* | Initial weighing (g) with solvent |
|---|---|---|
| Desmomelt ® 530 | 35.35 | |
| Desmomelt ® 530 solution in acetone (20% by weight Desmomelt ® 530 in acetone) | | 176.75 |
| Cyclohexyl methacrylate | 33.33 | 33.33 |
| N-Vinylcaprolactam | 10.10 | 10.10 |
| Trimethylolpropane trimethacrylate | 3.03 | 3.03 |
| (Dynasylan ® MEMO)** | 1.01 | 1.01 |
| Cumene hydroperoxide | 9.09 | |
| Peroxan ® CU-90L*** | | 10.10 |
| Aerosil ® R 202**** | 8.09 | 8.09 |
| Total | 100.00 | 242.41 |

*Solids here are all substances which are not solvents. The solvents here are acetone and cumene.
**3-trimethoxysilylpropyl methacrylate, Evonik
***90% by weight solution of cumene hydroperoxide in cumene, Pergan
****hydrophobized fumed silica, Evonik Comparative Example 3, Solution and Reactive Adhesive Film B

| Raw material | % by weight solids* | Initial weighing (g) with solvent |
|---|---|---|
| Desmomelt ® 530 | 38.50 | |
| Desmomelt ® 530 solution in acetone (20% by weight Desmomelt ® 530 in acetone) | | 192.50 |
| Cyclohexyl methacrylate | 36.30 | 36.30 |
| N-Vinylcaprolactam | 11.00 | 11.00 |
| Trimethylolpropane trimethacrylate | 3.30 | 3.30 |
| (Dynasylan ® MEMO)** | 1.10 | 1.10 |
| Iron(II) phthalocyanine | 1.00 | 1.00 |
| Aerosil ® R 202*** | 8.80 | 8.80 |
| Total | 100.0 | 254.00 |

*Solids here are all substances which are not solvents. The solvent here is acetone.
**3-trimethoxysilylpropyl methacrylate, Evonik
***hydrophobized fumed silica, Evonik Push-Out Test The push-out test provides information about the bond strength of a double-sidedly adhering adhesive product in the direction normal to the adhesive layer.

Sample Preparation for the Push-Out Test

Round diecuts having a diameter of 21 mm are punched from the reactive adhesive films A and B under investigation, which are each lined on both sides with a release liner. The release liners are then removed from one side each of a diecut. The diecuts, A or B, are placed congruently each onto a round sample disk of polycarbonate ("disk", first substrate, first test specimen) likewise having a diameter of 21 mm. The diecuts now each adhere to the "disk". The release paper still remaining on the diecuts is then removed. The discs are therefore now furnished with the reactive adhesive films A or B.

The curing reaction is initiated by contacting the diecuts A or B adhering to the "discs" with the counterpart diecuts or counterpart components.

If diecut A is on the "disc", therefore, diecut B is placed congruently onto diecut A. Alternatively, component B is applied thinly to diecut A with a brush stroke.

If diecut B is on the "disc", therefore, diecut A is placed congruently onto diecut B.

Alternatively, component A is applied thinly to diecut B with a brush stroke.

Following the consequent initiation of the curing reaction, the subsequent bonding with the second substrate must take place within a maximum of 15 minutes, since the curing reaction is now progressing.

For further preparation of the adhesive bonds, the last release liners still remaining on the diecuts, where appropriate, are each removed, so that the diecuts each lie open.

Bonding for the Push-Out Test

The second substrate (second test specimen) is a square perforated plate made of polycarbonate, polyamide 6 or anodized aluminum. The side lengths are each 40 mm. The perforation is in each case located centrally and is round, with a diameter of 9 mm.

The test specimens used are available, for example, from Rocholl, 74858 Aglasterhausen, Germany. The designations of the test specimens were as follows:

Polycarbonate: Makroform 099,
Polyamide 6: natural test specimen made by Sustaplast,
Anodized aluminum: alloy 5005A (AIMG1), anodized E6 EV1.

The round test specimens ("discs") furnished with the diecuts on which the curing reaction is proceeding are positioned on the perforated plate, by the open-lying side of the diecuts in each case, in such a way that the center of the round test specimen and the center of the perforation in the perforated plate lie one above the other. The assembly, held together by the pressure sensitive adhesiveness of the diecuts, and composed of square perforating plate, diecut A/diecut B or diecut B/diecut A or diecut A/component B or diecut B/component A, and the "disc", was then placed into a pneumatic pressing apparatus. A pressing pressure of 3 bar is exerted. The assembly is exposed to this pressure in each case for 60 seconds (pressing time) in each case at 23° C. The pressure is then removed. The assembly is then stored for three days at 23° C. and 50% relative humidity. During this time there is a gradually progressing curing reaction within the diecuts and a gradually strengthening adhesion between the diecuts and also to the substrates (test specimens). Bonding therefore takes place with a gradual increase in strength over time.

The assemblies, thus fully bonded, were subsequently subjected to different forms of further storage:

Storage 1: 72 hours (=3 days) at 23° C. and 50% relative humidity
Storage 2: 72 hours (=3 days) at 65° C. and 90% relative humidity (heat-and-humidity storage)

The push-out tests took place after reconditioning for 24 hours at 23° C. and 50% relative humidity.

Push-Out Test Procedure

Pressure was applied to the round test specimen ("disc") by means of a mandrel clamped into a tensile testing machine, which was pressed through the perforation in the perforated plate at a constant rate of 10 mm/min, perpendicularly (i.e., parallel to the normal vector onto the plane of the test specimen; centered centrally onto the middle of the perforation), until the bond had come undone to an extent such that a pressure drop of 50% was recorded. The pressure acting immediately before the pressure drop is the maximum pressure $P_{max}$. This value corresponds to the push-out value reported in the table [N/mm²]. All of the measurements were carried out in a temperature-controlled chamber at 23° C. and 50% relative humidity.

Results

Push-Out Test

| | | | Example 1 | Example 2 | Example 3 | Example 4 | Example 5 | Example 6 | Comparative example 1 | Comparative example 2 | Comparative example 3 |
|---|---|---|---|---|---|---|---|---|---|---|---|
| Storage 1: 3 days at 23° C. and 50% relative humidity | PC/PC bonds | Film A in contact with PC disc, film B in contact with PC plate | 4.2 (C) | 4.8 (C) | 4.8 (C) | 7.6 (C) | 4.4 (C) | 6.7 (C) | | | |

-continued

| | | Example 1 | Example 2 | Example 3 | Example 4 | Example 5 | Example 6 | Comparative example 1 | Comparative example 2 | Comparative example 3 |
|---|---|---|---|---|---|---|---|---|---|---|
| | Film B in contact with PC disc, film A in contact with PC plate | 4.4 (C) | 4.5 (C) | 4.9 (C) | 7.1 (C) | 4.0 (C) | 6.3 (C) | | | |
| | Film A in contact with PC disc and PC plate, Component B in contact with PC plate* | 4.1 (C) | 4.6 (C) | 4.9 (C) | 7.0 (C) | 4.4 (C) | 6.2 (C) | | | |
| | Film B in contact with PC disc and PC plate, Component A in contact with PC plate** | 4.0 (C) | 4.1 (C) | 4.3 (C) | 6.2 (C) | 4.1 (C) | 5.9 (C) | | | |
| PC/PA bonds | Film A in contact with PC disc, film B in contact with PA plate | 1.6 (A) | 1.7 (A) | 2.0 (A) | 1.9 (A) | 1.5 (A) | 1.7( A) | 1.2 (A) | 1.6 (A) | 1.4 (A) |
| | Film B in contact with PC disc, film A in contact with PA plate | 1.5 (A) | 1.8 (A) | 2.1 (A) | 1.6 (A) | 1.8 (A) | 1.4 (A) | 1.0 (A) | 1.5 (A) | 1.5 (A) |
| | Film A in contact with PC disc and PA plate, component B in contact with PA plate* | 1.4 (A) | 1.9 (A) | 1.8 (A) | 1.7 (A) | 1.5 (A) | 1.6 (A) | 1.3 (A) | 1.5 (A) | 1.3 (A) |
| | Film B in contact with PC disc and PA plate, component A in contact with PA plate** | 1.3 (A) | 1.2 (A) | 1.7 (A) | 1.2 (A) | 1.6 (A) | 1.5 (A) | 1.0(A) | 1.4 (A) | 1.4 (A) |
| PC/Al bonds | Film A in contact with PC disc, film B in contact with Al plate | 4.5 (C) | 2.9 (M) | 5.2 (C) | 4.6 (M) | 4.0 (C) | 4.2 (M) | | | |
| | Film B in contact with PC disc | 4.7 (C) | 3.2 (M) | 5.1 (M) | 4.9 (C) | 4.3 (C) | 4.1 (M) | | | |

-continued

|  |  |  | Example 1 | Example 2 | Example 3 | Example 4 | Example 5 | Example 6 | Comparative example 1 | Comparative example 2 | Comparative example 3 |
|---|---|---|---|---|---|---|---|---|---|---|---|
|  |  | film A in contact with Al plate |  |  |  |  |  |  |  |  |  |
|  |  | Film A in contact with PC disc and Al plate, component B in contact with Al plate* | 4.4 (C) | 3.0 (M) | 4.9 (M) | 4.1 (C) | 3.9 (C) | 3.8 (C) |  |  |  |
|  |  | Film B in contact with PC disc and Al plate, component A in contact with Al plate** | 4.0 (C) | 2.5 (M) | 4.4 (M) | 3.6 (C) | 3.1 (C) | 3.2 (C) |  |  |  |
| Storage 2: 3 days at 65° C. and 90% relative humidity (heat-and-humidity storage) | PC/PC bonds | Film A in contact with PC disc, film B in contact with PC plate | 5.4 (C) | 6.6 (C) | 5.0 (C) | 7.7 (C) | 5.0 (C) | 7.3 (C) |  |  |  |
|  |  | Film B in contact with PC disc, film A in contact with PC plate | 5.4 (C) | 6.9 (C) | 5.4 (C) | 7.9 (C) | 5.9 (C) | 6.8 (C) |  |  |  |
|  |  | Film A in contact with PC disc and PC plate, component B in contact with PC plate* | 5.0 (C) | 6.1 (C) | 5.5 (C) | 7.4 (C) | 5.3 (C) | 7.0 (C) |  |  |  |
|  |  | Film B in contact with PC disc and PC plate, component A in contact with PC plate** | 4.5 (C) | 5.3 (C) | 5.0 (C) | 7.4 (C) | 5.1 (C) | 6.7 (C) |  |  |  |
|  | PC/PA bonds | Film A in contact with PC disc, film B in contact with PA plate | 4.2 (C) | 6.2 (C) | 4.5 (C) | 6.3 (C) | 4.0 (C) | 5.9 (C) | 0.9 (A) | 1.8 (A) | 0.8 (A) |
|  |  | Film B in contact with PC disc, film A in contact with PA plate | 4.4 (C) | 6.0 (C) | 4.3 (C) | 6.7 (C) | 4.2 (C) | 5.6 (C) | 0.8 (A) | 1.6 (A) | 0.9 (A) |

-continued

| | | Example 1 | Example 2 | Example 3 | Example 4 | Example 5 | Example 6 | Comparative example 1 | Comparative example 2 | Comparative example 3 |
|---|---|---|---|---|---|---|---|---|---|---|
| | Film A in contact with PC disc and PA plate, component B in contact with PA plate* | 4.5 (C) | 5.8 (C) | 4.2 (C) | 6.5 (C) | 4.3 (C) | 5.6 (C) | 0.7 (A) | 1.5 (A) | 0.9 (A) |
| | Film B in contact with PC disc and PA plate, component A in contact with PA plate** | 4.3 (C) | 5.5 (C) | 4.0 (C) | 6.2 (C) | 4.1 (C) | 5.1 (C) | 0.5 (A) | 1.1 (A) | 0.8 (A) |
| PC/Al bonds | Film A in contact with PC disc, film B in contact with Al plate | 2.3 (M) | 4.2 (C) | 3.3 (C) | 4.9 (C) | 2.6 (M) | 3.9 (C) | | | |
| | Film B in contact with PC disc, film A in contact with Al plate | 2.5 (M) | 4.1 (C) | 3.0 (C) | 4.4 (C) | 2.7 (M) | 3.6 (C) | | | |
| | Film A in contact with PC disc and Al plate, component B in contact with Al plate* | 2.4 (M) | 4.0 (C) | 3.2 (C) | 4.6 (C) | 2.5 (M) | 3.0 (C) | | | |
| | Film B in contact with PC disc and Al plate, component A in contact with Al plate** | 2.1 (M) | 3.9 (C) | 3.0 (C) | 4.1 (C) | 2.6 (M) | 3.2 (C) | | | |

*It is assumed that component B undergoes partial migration into adhesive film A, and so adhesive film A is also in contact with the plate.
**It is assumed that component A undergoes partial migration into adhesive film B, and so adhesive film B is also in contact with the plate.
Abbreviations:
PC = polycarbonate
PA = polyamide 6
Al = anodized aluminum
Fracture modes:
A: adhesive (always to polyamide or aluminum)
C: cohesive
M: mixed fracture (adhesive component always to polyamide or aluminum)

DISCUSSION OF THE RESULTS

The reactive adhesive film of the invention and, respectively, the reactive adhesive film system of the invention represent a significant improvement over the prior art in terms of the bond strength of polyamide bonds after heat-and-humidity treatment. The surprising result is obtained that the bond strength of polyamide bonds increases significantly by comparison with the fresh value, after heat-and-humidity treatment. The results for the comparative examples show that this effect is not achieved with reactive monomers other than those selected in accordance with the invention.

The invention claimed is:

1. A reactive adhesive film system comprising two reactive adhesive films comprising (a) a polymeric film-forming matrix, (b) at least one reactive monomer comprising an epoxide-functionalized acrylic ester or epoxide-functionalized methacrylic ester or an epoxide-functionalized vinyl compound and (c) a reagent selected from an initiator, or an activator, wherein the first reactive adhesive film comprises a radical initiator and the second reactive adhesive film comprises an activator.

2. A reactive adhesive film system comprising two or more reactive adhesive films according to claim 1, and these two reactive adhesive films are each present alternately.

3. The reactive adhesive film system of claim 1 comprising further films, layers, adhesives, backings, release papers and/or release liners.

4. The reactive adhesive film system of claim 1, wherein the at least one reactive monomer comprises an acrylic ester or methacrylic ester functionalized with one or with two or more cycloaliphatic epoxide groups or a vinyl compound functionalized with one or more cycloaliphatic epoxide groups.

5. The reactive adhesive film system of claim 1, wherein the at least one reactive monomer comprises 3,4-epoxycyclohexylmethyl acrylate (CAS No.: 64630-63-3) or 3,4-epoxycyclohexylmethyl methacrylate (CAS No.: 82428-30-6) or 1,2-epoxy-4-vinylcyclohexane (CAS No.: 106-86-5).

6. The reactive adhesive film system of claim 1, wherein the polymeric film-forming matrix comprises a thermoplastic polymer.

7. The reactive adhesive film system of claim 1, wherein the radical initiator comprises a peroxide.

8. The reactive adhesive film system of claim 7, wherein the peroxide is a hydroperoxide.

9. The reactive adhesive film system of claim 7, wherein the peroxide is diisopropylbenzene peroxide.

10. The reactive adhesive film system of claim 1, wherein the activator comprises a dihydropyridine derivative or a transition metal complex.

11. The reactive adhesive film system of claim 1 which exhibits pressure sensitive adhesion.

12. A composite bonded by the reactive adhesive film of claim 1.

13. A kit providing a two-component adhesive film system, comprising
   (i) at least one first reactive adhesive film comprising (a) a polymeric film-forming matrix, (b) at least one reactive monomer comprising an epoxide-functionalized acrylic ester or epoxide-functionalized methacrylic ester or an epoxide-functionalized vinyl compound and (c) a reagent selected from an initiator, or an activator which comprises a radical initiator, and
   (ii) at least one second reactive adhesive film comprising (a) a polymeric film-forming matrix, (b) at least one reactive monomer comprising an epoxide-functionalized acrylic ester or epoxide-functionalized methacrylic ester or an epoxide-functionalized vinyl compound and (c) a reagent selected from an initiator, or an activator which comprises an activator.

14. The kit according to claim 13, wherein the at least one reactive monomer comprises an acrylic ester or methacrylic ester functionalized with one or with two or more cycloaliphatic epoxide groups or a vinyl compound functionalized with one or more cycloaliphatic epoxide groups.

15. The kit according to claim 13, wherein the at least one reactive monomer comprises 3,4-epoxycyclohexylmethyl acrylate (CAS No.: 64630-63-3) or 3,4-epoxycyclohexylmethyl methacrylate (CAS No.: 82428-30-6) or 1,2-epoxy-4-vinylcyclohexane (CAS No.: 106-86-5).

16. The kit according to claim 13, wherein the polymeric film-forming matrix comprises a thermoplastic polymer.

17. The kit according to claim 13, wherein the radical initiator comprises a peroxide.

18. The kit according to claim 17, wherein the peroxide is a hydroperoxide.

19. The kit according to claim 17, wherein the peroxide is diisopropylbenzene peroxide.

20. The kit according to claim 13, wherein the activator comprises a dihydropyridine derivative or a transition metal complex.

* * * * *